(12) United States Patent
Bell

(10) Patent No.: US 7,521,107 B2
(45) Date of Patent: Apr. 21, 2009

(54) RECYCLED POLYVINYL BUTYRAL COMPOSITIONS AND USES

(75) Inventor: Michael E. Bell, Lexington, VA (US)

(73) Assignee: Mohawk Brands, Inc., Wilmington, DE (US)

( * ) Notice: Subject to any disclaimer, the term of this patent is extended or adjusted under 35 U.S.C. 154(b) by 775 days.

(21) Appl. No.: 10/378,683

(22) Filed: Mar. 5, 2003

(65) Prior Publication Data
US 2004/0175535 A1 Sep. 9, 2004

(51) Int. Cl.
*B32B 33/00* (2006.01)
(52) U.S. Cl. .......................................... 428/97; 428/95
(58) Field of Classification Search .................. 428/95, 428/97, 44, 47
See application file for complete search history.

(56) References Cited

U.S. PATENT DOCUMENTS

| | | | |
|---|---|---|---|
| 3,578,489 A | 5/1971 | Gelb | |
| 3,681,185 A | 8/1972 | Gelb | |
| 4,010,301 A * | 3/1977 | Anderson et al. | 428/95 |
| 4,010,302 A * | 3/1977 | Anderson et al. | 428/95 |
| 4,405,674 A * | 9/1983 | Kyle | 428/96 |
| 4,571,353 A * | 2/1986 | Gable, Jr. | 428/33 |
| 5,221,708 A * | 6/1993 | Klaiber | 524/502 |
| 5,380,794 A * | 1/1995 | Schaefer et al. | 525/57 |
| RE34,951 E * | 5/1995 | Slosberg et al. | 428/95 |
| 5,429,865 A | 7/1995 | Bottcher et al. | |
| 5,728,741 A * | 3/1998 | Zegler et al. | 521/40 |
| 5,770,654 A * | 6/1998 | Blatz | 525/179 |
| 5,886,075 A * | 3/1999 | Keane et al. | 524/308 |
| 6,162,748 A | 12/2000 | Schilling et al. | |
| 6,506,835 B1 * | 1/2003 | Hofmann | 525/63 |
| 6,734,216 B2 * | 5/2004 | Bergeron | 521/48 |

(Continued)

FOREIGN PATENT DOCUMENTS

DE 4202948 A1 * 8/1993

(Continued)

OTHER PUBLICATIONS

Cha, Yoon-Jong, et al, *Morphology and Mechanical Properties of Nylon 6 Toughened with Waste Poly (vinyl butyral) Film*, Journal of Applied Polymer Science, vol. 67, 1431-1540 (1998).

(Continued)

*Primary Examiner*—Cheryl Juska
(74) *Attorney, Agent, or Firm*—Alston & Bird, LLP

(57) ABSTRACT

By utilizing recovered polyvinyl butyral in the production of carpet backcoatings, the amount of waste polyvinyl butyral that is landfilled or otherwise disposed of is significantly reduced, as is the need for manufacturing polyvinyl butyral. The recovered polyvinyl butyral is size reduced and then utilized by itself or with other ingredients to provide a composite used in the manufacture of a useful product (like carpet backing), and then the composite material is used to make the useful product (such as carpet backing, which is used as a primary or secondary backcoating in the manufacture of new carpeting or as a precoat, main back coat or combination precoat/main back coat in the manufacture of new carpet tile). In addition, waste carpet may optionally be used with the recovered polyvinyl butyral as a filler material; thus, further reducing the amount of waste that is landfilled or incinerated.

27 Claims, 2 Drawing Sheets

U.S. PATENT DOCUMENTS

2003/0077433 A1 4/2003 Dohring
2003/0212203 A1* 11/2003 Hofmann ..................... 525/63

FOREIGN PATENT DOCUMENTS

| | | |
|---|---|---|
| DE | 20108668 | 8/2001 |
| EP | 664355 | 7/1995 |
| EP | 850743 A1 * | 7/1998 |
| EP | 1104783 | 6/2001 |
| GB | 1 469 955 | 5/1974 |
| JP | 62059640 A * | 3/1987 |
| WO | WO 9302141 A1 * | 2/1993 |
| WO | WO 9957196 A1 * | 11/1999 |
| WO | WO 0121367 A1 * | 3/2001 |

OTHER PUBLICATIONS

Blomstrom, Thomas P., *Polyvinyl Acetal Resins*, Coatings Technology Handbook 1991, pp. 417-434.

* cited by examiner

RECYCLED POLYVINYL BUTYRAL COMPOSITIONS AND USES

BACKGROUND AND SUMMARY OF THE INVENTION

In the conventional manufacture of floor coverings such as carpeting, pile carpets, carpet tiles or the like, the pile yarns or other carpet face materials are held in place by a primary backing and typically backcoatings, precoats, and/or main backcoats as well as possibly other layers associated with the carpeting. At least some of these backcoatings, precoats and maincoats (particularly latex, ethylene vinyl acetate or other polymer-based backings) use different ingredients as important components thereof.

The present invention utilizes post-consumer and/or post-industrial polyvinyl butyral (referred to herein as waste, recovered or recycled PVB, all of which are considered interchangeable and the same for this invention) as all, nearly all or part of the backcoating, precoat and main backcoat compositions for floor coverings such as carpeting, pile carpets and carpet tiles. In preferred embodiments, the invention utilizes: (a) mixtures of recycled PVB, plasticizer and filler as a backcoating composition, (b) mixtures of recycled PVB, plasticizer, ethylene vinyl acetate (EVA) and filler as a backcoating composition (defined herein as a "coating" composition), (c) mixtures of recycled PVB, tackifier composition(s), EVA and filler (and, optionally, a plasticizer) as a coating or precoat and main backcoat compositions (precoat and main backcoat compositions are defined herein as "coat" compositions), (d) mixtures of recycled PVB, plasticizer, anionic surfactant and filler as precoat and main backcoat compositions, or extruded alone or in combination with fillers or other additives either onto a substrate to be inserted into the structure of a floorcovering or other coated item, or extruded directly onto the partially constructed item. These recycled PVB compositions exhibit excellent chemical and physical properties, including long term durability and compatibility with other floorings (e.g., carpet paddings and subfloors).

Increased usage and disposal of various polymer materials, environmental awareness, government regulations concerning the disposal of polymers, and technical difficulties encountered in the re-usage of disposed polymers have created the need for acceptable recycling usages of disposed (waste) polymers. Disposed PVB is one type of polymer for which there are few acceptable recycling usages because of, among other things, its various adjuvants and contaminants.

PVB is used in large quantities in safety glass for vehicles, some buildings and certain other applications. Sources of disposed PVB include the dismantling of vehicles and the waste from manufacturing safety glass for vehicles such as automobiles, trucks, buses, et cetera. According to the present invention, the PVB can be separated from the glass via commercial windshield glass recycling methods or via commercial recovery methods associated with safety glass manufacturing. For example, the glass from the safety glass can be recovered by crushing, grinding and milling of the scrap safety glass, which yields small glass particles and PVB. The resulting glass particles are then recycled. The resulting PVB is typically disposed of in landfills or by incineration. Instead of disposal, the present invention recycles the PVB.

According to the present invention, it has been found that recycled PVB can be processed and used in certain carpet coating and coat compositions so as to alleviate the environmental and related problems identified above. In the present invention, the recycled PVB is obtained from the aforementioned commercial methods as pellets, particles or powders, for example, pellets or particles preferably about $1/16$ inch to about $3/8$ inch, or powder preferably between about 10 and 16 mesh. Processing comprises separating the PVB from glass and other components through shredding and density differences using conventional equipment, and grinding the PVB to the desired sizes using conventional equipment, which can be accomplished at ambient conditions, and can include, at various points in the separating and grinding process, the separation of various glass and metal contaminants. Conventional processing such as the Andela Windshield Pulverizing System, the commercial system used by Dlubak Glass Company of Upper Sandusky, Ohio, or any other system that uses a series of shredders, grinders and/or separators, can be used to reduce the chips to the foregoing sizes for employment in the compositions of the invention. The recycled PVB that can be used in the present invention can contain adjuvants or contaminants such as plasticizers, glass, sand, et cetera, which greatly assists with near complete recycling. The commercially obtained recycled PVB in the foregoing sizes may have minute amounts of glass, metal, or other adjuvants or contaminants, which are typically not in sufficient amounts to adversely impact the present invention. According to the present invention, undesired adjuvants and/or contaminants can be removed by conventional processing either before or after size reduction of the recycled PVB.

The present invention preferably utilizes plasticizers in conjunction with the recycled PVB in order to prepare certain carpet backing compositions. Acceptable plasticizers for use with the recycled PVB of the invention include, but are not limited to, butyl benzoate, benzyl benzoate, butyl oleate, and blends with each other and other plasticizers. In some 10 cases, the plasticizer may be replaced with or blended with any number of glycol products, including but not limited to poly (oxy) ethylene glycol, 1,3 propanediol and others.

For carpet tile precoats, the present invention also preferably utilizes a poly(ethylene oxide) polymer such as POLYOX™ (supplied by Dow) in a preferable amount of about 0.5-10% by weight of the composition. This ingredient improves the runnability on coating equipment.

The invention can also utilize tackifiers that include, but are not limited to, hydrocarbon resins, other tackifiers, and mixtures thereof.

The particular carpet coating and coat compositions of the present invention may also comprise a filler or filler mixture. The preferred fillers are calcium carbonate, recycled carpet material ground to filler size, and mixtures thereof or in combination with other materials. The calcium carbonate is preferably about ninety-nine percent or greater crushed limestone, and less than about one percent crystalline. The calcium carbonate is preferably of a size typically known in the carpet industry for laminating compounds.

The recycled carpet that can be used as filler in the present invention can be obtained in several ways. For example, during typical carpet manufacturing processes, waste carpeting is produced, which is typically landfilled or incinerated. In addition, when new carpets are installed in place of old carpeting, the used, waste carpeting (which is post-consumer waste carpeting) is removed from a building and is typically landfilled or burned. Instead of landfilling or incinerating these waste carpets, the present invention can use them as recycled carpet filler material. According to the present invention, the components of the recycled carpet are separated and ground to filler size by using standard shredding, grinding and separation techniques.

The recycled carpet can contain calcium carbonate or like mineral fillers, which can be retained and used in the compositions of the present invention. In certain waste carpets, other materials, such as thermoplastic resins, form constituent parts of the waste material together with the calcium carbonate filler and can also be retained and used in the compositions of the present invention. Use of this recycled carpet material eliminates, or at least significantly reduces, the amount of landfilling or other waste disposal that is necessary for waste carpeting.

As noted above, instead of using any freshly mined limestone calcium carbonate as the filler for a carpet backing composition, recycled waste carpet containing calcium carbonate as well as a thermoplastic resin (from new carpet production and/or from post-consumer waste) can be used as a filler material in the present invention. The recycled material may also be used in conjunction with fresh calcium carbonate, e.g., freshly mined and crushed limestone, as well as fresh thermoplastic resin.

The carpet backing compositions and carpet backing of the present invention are prepared in and by conventional heated systems that are used to prepare standard types of carpet backing. The systems, however, do not need to be heated. The inventive compositions are beneficially designed to be applied to the back of carpets and carpet tiles by conventional coating and application equipment.

According to a preferred aspect of the present invention, there is provided a method of recycling PVB comprising substantially sequentially: (a) collecting recovered PVB, (b) size reducing the recovered PVB, (c) processing the recovered PVB with other ingredients, (d) creating a composite material useful in the manufacture of a useful product, and (e) making the useful product using the composite material. Steps (c) and (d) can be combined to result in the processing of recovered PVB, appropriately sized, with other ingredients to create a composite material useful in the manufacture of a useful product (e.g., primary or secondary backcoating for carpets, or precoats, main backcoats or combination precoat/main backcoats for carpet tiles).

In the method, step (a) may be practiced to collect substantially only post-consumer recovered PVB, substantially only post-industrial recovered PVB (e.g., from new product manufacturing), or a blend of both. As stated above, PVB can be separated and recovered from used or discarded safety glass via commercial windshield glass recycling methods or via commercial recovery methods associated with safety glass manufacturing. Post-consumer recovered PVB or post-industrial recovered PVB can be processed to remove certain contaminants or adjuvants by using any conventional technique, if desired or necessary.

In the method, step (b) may be practiced by reducing the recovered PVB to a certain size by conventional techniques [such as grinding using conventional grinders]. For use in carpet backing, it is preferable to reduce the recycled PVB to about 1/16 inch for sizing through a 40 mesh screen. For extruding or other melt applications such as a heated slot, the standard 3/8 inch size generated in the size reduction of windshields can be used. For use in carpet tile back coats (precoats or main backcoats), it is preferable to reduce the recycled PVB so that about 90% or more of the PVB can pass through a standard number 12 sieve (Tyler 10 mesh; 1.70 mm or 0.0661 inch), but less than or equal to about 10% may pass through a standard number 18 sieve (Tyler 16 mesh; 1.0 mm or 0.0394 inch).

In the method, step (c) may be practiced to utilize calcium carbonate as a filler material, where the calcium carbonate is a size commonly used in the carpet industry for laminating compounds. In addition, step (c) may be practiced to utilize as a filler ingredient substantially only post-consumer waste carpeting, substantially only post-industrial waste carpeting (e.g., from new carpeting manufacture), a blend of both, or a blend with fresh calcium carbonate. In this regard, and for their additional disclosures, pending U.S. patent application Ser. No. 09/686,798, pending U.S. patent application Ser. No. 09/782,518, and pending U.S. patent application Ser. No. 09/986,058 filed Nov. 7, 2001, issued as U.S. Pat. No. 6,786,988 on Sep. 7, 2004, are hereby incorporated by reference in their entireties. If desired or necessary, post-consumer waste carpeting can be cleaned by any conventional cleaning technique before use in the present invention. While the method can be typically practiced utilizing all of the face yarn, primary backing and backcoatings of the waste carpeting, the method may further comprise separating the face yarn and primary backing from waste carpet backcoating to produce a substantially face yarn and primary backing-free waste carpet backcoating, and using substantially only the waste carpet backcoating. Also, various waste carpet backings may be separated from each other so as to use only one particular carpet backing, such as the primary or secondary backcoating.

In the method, step (c) may be practiced to utilize an acceptable plasticizer such as butyl benzoate, benzyl benzoate, butyl oleate, and blends thereof or in combination with other acceptable plasticizers for carpet backing compositions. In an embodiment of the present invention, the plasticizer may be present in amounts of about 1-30% by weight based on the total weight of the composition, and further embodiments include about 1-20% by weight or about 5-30% by weight depending on the other ingredients of the composition. The plasticizer may be replaced with or blended with any number of glycol products, including but not limited to poly (oxy) ethylene glycol, 1,3 propanediol and others. In an embodiment of the present invention, the glycol product may be present in amounts of about 1-30% by weight based on the total weight of the composition, and further embodiments include about 1-20% by weight or about 5-30% by weight depending on the other ingredients of the composition. For extrusion coating, plasticizers and glycol products are not needed.

In the method, step (c) may be practiced to utilize EVA, an acceptable tackifier such as a hydrocarbon resin blend, and various mixtures thereof. The EVA can be used in the present invention without a tackifier. The EVA can be Elvax™ (supplied by du Pont), Escorene™ (supplied by Exxon) or similar types. The tackifier can be Escorez™ ECR 171, supplied by Exxon, XR-4231 supplied by Arizona Chemical or other similar resins. Promising results may also be obtained by using Eastoflex™ resins (supplied by Eastman).

In the method for preparing carpet tile precoat or precoat/maincoat backing compositions, step (c) may be practiced to utilize an anionic surfactant such as Novawet PPW™ (supplied by Boehme-Filatex) or similar anionic surfactants. Water may also be utilized. For example, for carpet tile type applications, it is preferable to use PPW as part of the system. Water is optional and may only be present as a medium to carry the mixture. Consequently, steps (c) and (d) may be combined as one step to create a composite.

In the method, step (d) may be utilized to create the composite material, which can be applied to substrates that subsequently become part of a carpet or carpet tile.

In another method of producing a carpet tile type product or a replacement for traditional PVC coated carpet products, 100% by weight recycled PVB or blends of recycled PVB and carpet filler (e.g., calcium carbonate in filler size and/or recycled waste carpet material ground to filler size) may be created and then extruded onto a fiberglass stabilizing scrim of the type common to carpet tile manufacturing, either spun-bonded or woven, or onto primary or secondary backings such as those common for broadloom or tile carpets, or directly onto the back of tufted or woven floorcovering.

The invention can also employ as additional optional steps, in advance of step (c), collecting waste carpeting, processing the waste carpeting to provide a first material from the waste carpeting, which may contain a filler and a thermoplastic resin, and reducing the first material to a predetermined size in a range of about 50-100 to about 95-325, wherein the first number represents the percentage of the first material which will pass through a mesh screen having a mesh size corresponding to the second number.

Additionally, the composite material may be processed in molten form to have a viscosity in the range of about 10,000 to about 30,000 CPS. The latter viscosity range is particularly useful for forming a primary or secondary backcoating for carpeting.

Conventional machines, processes and techniques known in the carpet industry can be employed to practice the steps of the present invention, including standard mixing and heating systems used to manufacture carpet backing compositions and carpet backings in step (e) of the method.

In one embodiment of the useful product formed hereby, the carpet product may have a primary or secondary backing or backcoating made from greater than 0% and up to about 100% by weight recycled PVB. In another embodiment of the useful product formed hereby, the carpet product may have a primary or secondary backing or backcoating made from greater than 0% and up to about 50% by weight recycled PVB based on the total weight of the primary or secondary backing or backcoating, about 1-10% by weight EVA, about 30-40% by weight tackifier resin, about 0-55% by weight filler (or greater than 0% and up to about 55% by weight filler), wherein the filler comprises calcium carbonate and/or recycled waste carpet material, and, optionally, about 1-30% by weight plasticizer. In a further embodiment of the useful product formed hereby, the carpet product may have a primary or secondary backing or backcoating made from greater than 0% and up to about 20% by weight recycled PVB primary or secondary backing or backcoating, about 0-10% by weight EVA, about 30-40% by weight tackifier resin, about 0-55% by weight filler (or greater than 0% and up to about 55% by weight filler), wherein the filler comprises calcium carbonate and/or recycled waste carpet material, and, optionally, about 1-20% by weight plasticizer.

In another embodiment of the useful product formed hereby, a carpet tile product may have a precoating, backcoating or combined precoating/backcoating made from about 1-100% by weight recycled PVB based on the total weight of the precoating, backcoating or combined precoating/backcoating. In another embodiment of the useful product formed hereby, a carpet tile product may have a precoating, backcoating or combined precoating/backcoating made from about 15-60% by weight recycled PVB based on the total weight of the precoating, backcoating or combined precoating/backcoating, about 10-25% by weight plasticizer, about 0.25-10% by weight anionic surfactant, about 20-60% by weight filler, wherein the filler comprises calcium carbonate and/or recycled waste carpet material, and about 0-10% by weight water.

It will be appreciated that the recycled PVB compositions and methods of the invention are useful to form carpet primary and secondary backings, backcoatings and carpet tile precoats, backing coats and combination precoat/backing coats. The invention also further comprises making new carpeting with the carpet backcoatings made from recycled PVB.

DETAILED DESCRIPTION OF THE DRAWINGS

Figure 1:
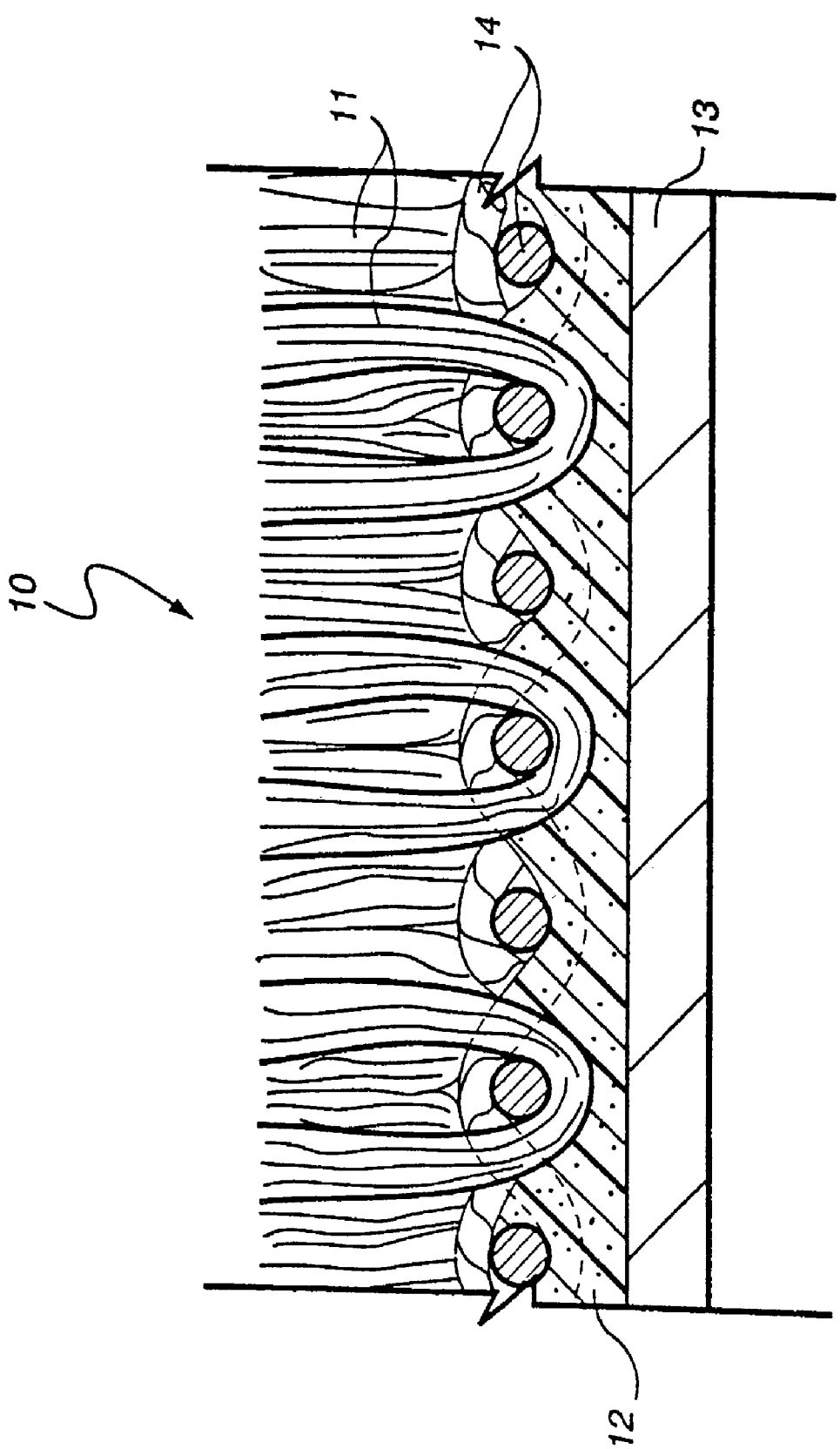
FIG. 1 is a schematic cross-sectional view of conventional carpeting, or carpeting produced according to the present invention.

A standard construction of carpeting is illustrated schematically by reference numeral 10 in FIG. 1. The carpeting includes face yarn 11, tufted into a woven or spun bonded fabric 14 known as a primary backing. The primary backing 14 has pile yarns 11 tufted therethrough extending outwardly from one face, a primary backcoating or precoat 12 on the opposite face, and at least one secondary backcoating or main backcoating (main backcoat) 13. Other layers may also be associated with the carpeting 10. The primary backcoating or precoat 12 typically comprises latex, PVC (polyvinylchloride), EVA (ethylene vinyl acetate), or other polymer-based material, and the secondary backcoating 13 may also comprise or include polymers. Typically one or both of the primary backcoatings 12 and secondary backcoating(s) 13 include filler. The most common filler is mineral filler, typically calcium carbonate, although other fillers may be utilized, or calcium carbonate can be used with other common materials such as metal salts. According to the invention, carpeting 10 may be produced with the primary backcoating or precoat 12 and secondary backcoating(s) or maincoat(s) 13 comprising recycled PVB and possibly using waste carpeting instead of calcium carbonate as all or part of the filler.

The carpeting 10 may also have any number of other layers, depending upon use. For example, the carpeting 10 may have a conventional secondary backing (typically a woven or needle punched fabric adapted to contact the floor or padding).

Figure 2:
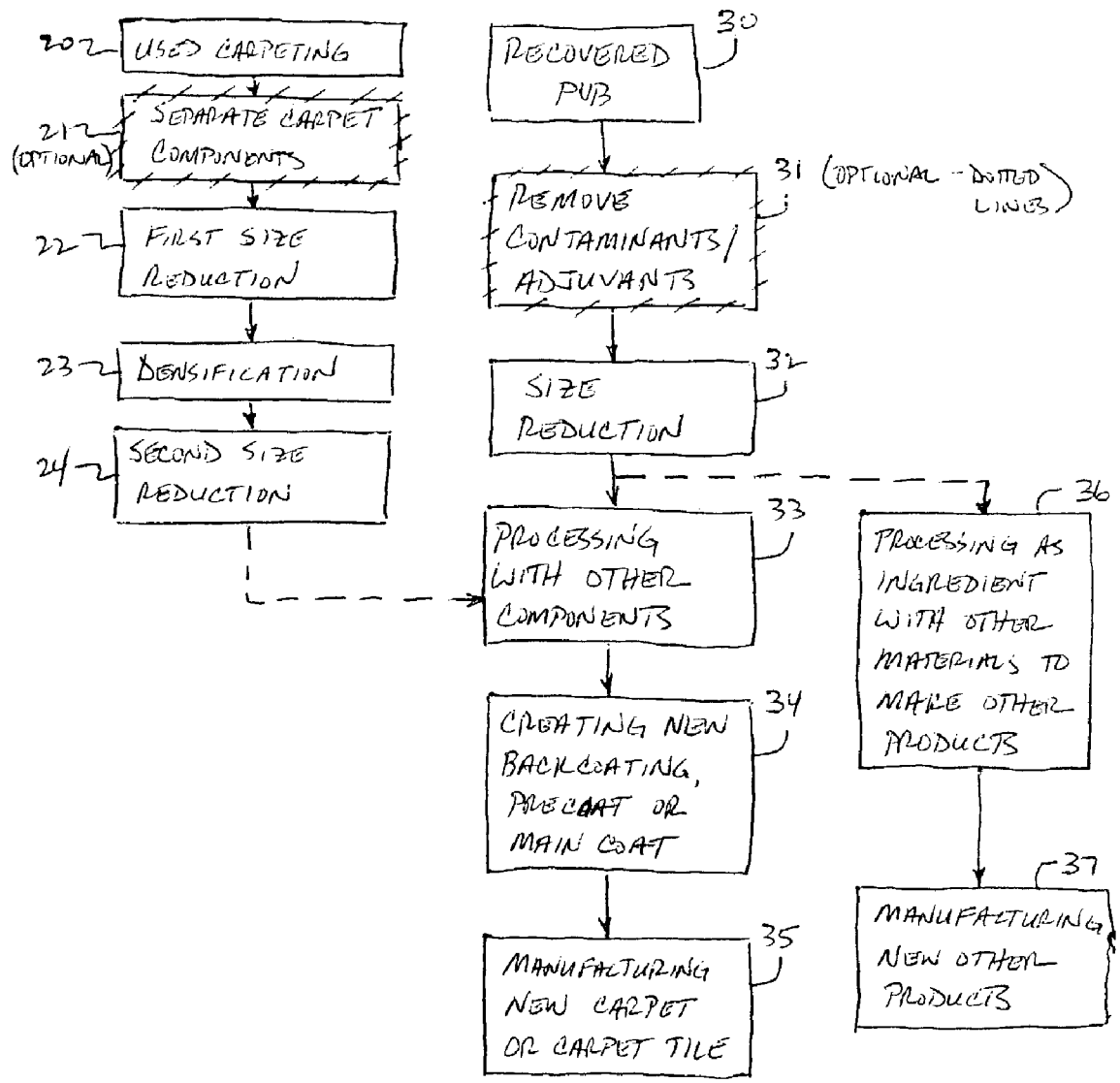
FIG. 2 is a block diagram illustrating various method procedures that may be practiced according to the present invention.

FIG. 2 schematically illustrates an exemplary process according to the present invention. In the process, recovered PVB is initially collected as indicated at 30 in FIG. 2. The collection may comprise post-consumer and/or post-industrial waste PVB, and is subsequently referred to as recovered or recycled PVB. If the recycled PVB contains any unwanted amounts of contaminants or adjuvants, the contaminants or adjuvants may be removed or reduced in amount as indicated at 31 in FIG. 2. For example, the contaminants or adjuvants may be removed or reduced in amount using any suitable conventional techniques, either before or after size-reduction as hereinafter described.

In the exemplary process, the recycled PVB is reduced to a certain size as indicated at 32 in FIG. 2. The recycled PVB may be reduced by conventional techniques. In the present invention, the recycled PVB may be obtained from the aforementioned commercial methods as pellets, particles or powders, for example, pellets or particles preferably about $\frac{1}{16}$ inch to about $\frac{3}{8}$ inch, or powder preferably between 10 and 16 mesh. Conventional processing that comprises separating the PVB from glass and other components through shredding and density differences using conventional equipment, and grinding the PVB to the desired sizes using conventional equipment, which can be accomplished at ambient conditions, and can include, at various points in the separating and grinding process, the separation of various glass and metal contaminants. Conventional processing such as the Andela Windshield Pulverizing System, the commercial system used by Dlubak Glass Company of Upper Sandusky, Ohio, or any other system that uses a series of shredders, grinders and/or separators, can be used to reduce the chips to the foregoing sizes for employment in the compositions of the invention. As noted above, the recycled PVB that can be used in the present invention can contain adjuvants or contaminants such as plasticizers, glass, sand, et cetera, which greatly assists with near complete recycling. The commercially obtained recycled PVB in the foregoing sizes may have minute amounts of glass, metal, or other adjuvants or contaminants, which are typically not in sufficient amounts to adversely impact the present invention. According to the present invention, undesired amounts of adjuvants and/or contaminants can be removed by conventional processing either before or after size reduction of the recycled PVB.

For use in carpet backing, it is preferable to reduce the recycled PVB to powder for approximately 20 mesh or chips of about 1/16 inch using a 40 mesh screen, but chips can be utilized in the range of less than or equal to about 3/8 inch. Chips in the range of 3/8 inch used in a hot melt formula may require additional heat to soften them for preferable application processing.

For use in carpet tile back coats, it is preferable to reduce the recycled PVB so that 90% or greater of the PVB can pass through a standard number 12 sieve (Tyler 10 mesh; 1.70 mm or 0.0661 inch), but less than or equal to 10% may pass through a standard number 18 sieve (Tyler 16 mesh; 1.0 mm or 0.0394 inch). Conventional processing is used to reduce the chips to these sizes for employment in the compositions of the invention.

In the exemplary process, the size-reduced, recycled PVB is processed with other ingredients as indicated at 33 in FIG. 2. For making a carpet backing composition, the following is one of the preferred compositions: greater than 0% and up to about 20% by weight recycled PVB based on the total weight of the composition and where the PVB is sized to about 1/16 inch or less; about 30-38% by weight tackifier resin of the Escorez™ ECR 171 type; about 0-10% by weight of EVA of the Elvax™, Escorene™ or similar types; about 0-55% by weight calcium carbonate filler (preferably greater than about 99% limestone and less than about 1% crystalline) and/or recycled carpet material, ground to filler size as commonly used in the carpet industry for laminating compounds; and, optionally, a plasticizer.

In the exemplary process, the system for preparing the carpet backing composition preferably consists of jacketed mix tanks that are steam heated to create a hot melt mix, but other conventional systems can be used. The ingredients are preferably delivered by conventional methods via pressurized enclosed systems to the tanks, although there exists the capability to add through a hatch on the top of the tank. All tanks are preferably positioned on load cells for accurate weighing. The hot melt mix is pumped to the production line in heated jacketed pipes to maintain the temperature. The application to the carpet follows and is described below.

Preferably, the recycled PVB would be added to the mix tanks after the other ingredients and at a preferred temperature of about 330-360° F. It has been noted that all of the recycled PVB may not melt at these temperatures, but may preferably become dispersed in the mix, thereby creating a back coating composition, as schematically indicated by 34 in FIG. 2. Subsequently, as schematically indicated at 35 in FIG. 2, and using standard processing techniques and equipment, the mix is preferably applied to the carpet at temperatures between 320-340° F. via the applicator roll/doctor bar mentioned herein. Using conventional techniques and equipment, the coated fabric is preferably joined with the secondary backing (which may also be based on the recycled PVB composition of the present invention) and pressed to join, followed by cooling of the composite.

In the exemplary process for making a carpet backing composition such as a tile precoat compound, or a combined precoat/main backcoat composition, the following is one of the preferred compositions: about 15-65% by weight recycled PVB sized so that greater or equal to 90% of the PVB passes through a standard #12 sieve (Tyler 10 mesh; 1.70 mm or 0.0661 inch) but less than or equal to 10% may only pass through a standard #18 sieve (Tyler 16 mesh; 1.0 mm or 0.0394 inch); about 10-25% by weight plasticizer such as the types normally used in the preparation of PVB for glass applications, including, but not limited to, butyl benzoate, benzyl benzoate, other esters of benzoic acid, blends of these and other plasticizers; about 0.25-10% by weight of an anionic surfactant such as Novawet PPW™; about 0-60% by weight calcium carbonate filler (preferably greater than about 99% limestone and less than about 1% crystalline) and/or recycled carpet material, ground to filler size as commonly used in the carpet industry for laminating compounds; and about 0-10% by weight water.

According to the present invention, the tile precoat/maincoat mix can be preferably prepared in conventional equipment normally used to prepare latex carpet compounds, or PVC plastisols, but can be prepared in other equipment as well. The mix is preferably applied to the carpet via conventional puddle application with subsequent roll doctoring to the desired level. Preferably, using conventional techniques and equipment, the coated material is subject to heat to fuse the recycled PVB composition, at about 350° F. Alternatively, the process may combine the recycled PVB and some wet ingredients at the point of application to reduce the amount of wet ingredients required for the final composition if applied as such. The coated carpet preferably passes through a series of calendar rolls and/or embossing rolls to form the back surface.

The PVB compositions of the invention are preferably extruded onto carpet stabilizing scrims using conventional single or twin-screw extruders. The material may exit the extruder as a rope or sheet and can then be calendered to the proper width and thickness. If applied with filler, the filler can be added at the extruder, preferably a twin screw to obtain proper blending, or blended with the recycled PVB prior to the extruders.

Coated stabilizing scrim can be utilized in place of the normal scrim and may replace a portion of the normal laminating compound used to bond the scrim. Additional heat may be applied to the coated substrate to initiate the tackiness attributed to the recycled PVB.

For making a carpet backing composition according to the foregoing preferred tackifier/EVA compositions and processes, it is preferred that the material is of such viscosity (about 13,000-20,000 CPS @ 310° F.) to be applied via conventional applicator/doctor bar technology and to deliver acceptable tuft bind, delamination, flammability and other properties common in the commercial carpet marketplace. When extruded onto carpet backing materials, the composition would adhere to the other components. When extruded onto secondary backing that is attached to the carpet, the composition has also demonstrated impermeability to moisture poured onto the surface of the finished product as prescribed in some carpet specifications, commonly referred to as the British Spill Test.

For making a tile carpet precoat compound, or a combined precoat/maincoat composition according to the foregoing preferred compositions, similar properties as above are desired, but also dimensional stability when used in conjunction with other components to manufacture a carpet tile. When extruded onto the stabilizing scrim for carpet tile and inserted into the composite, the composition would bond with the other components to form a carpet tile product that would meet all necessary specified properties. Coated secondary backings could be entered into the product as normally is done with secondary backing. The heat of the hot melt mix has been found to be sufficient to bond the coated material to the carpet. Additional heat may help to initiate that bond or to make it stronger. Also, the amount of hot melt mix may be reduced due to the tackifying properties of the recycled PVB.

In an alternative embodiment of the present invention, for application to substrates that subsequently become part of a carpet or carpet tile, 100% recycled PVB or blends of recycled PVB and carpet filler (for example, calcium carbonate filler and/or recycled carpet material, ground to filler size as commonly used in the carpet industry for laminating compounds) may be extruded onto a fiberglass stabilizing scrim of the type common to carpet tile manufacturing, either spun-bonded or woven, or onto primary or secondary backings such as those common for broadloom or tile carpets. A number of the compositions can exhibit acceptable dimensional stability as measured by the industry standard Aachen test without the use of the stabilizing scrim.

According to other embodiments of the present invention, the recycled PVB and/or mixtures with fillers and other polymers can be extruded either as a stand-alone sheet (film) or extruded onto a substrate, using conventional technology. This sheet or coated substrate can be incorporated into a floor covering either by becoming a layer of a laminant encapsulated by other layers of the multi-layer product or attached to the bottom side of the floor covering. Encapsulation may be between a layer of liquid or plastisol product that react with the sheet, or becomes fused to the other layers via heat/pressure. The recycled PVB has inherent hot melt adhesive properties with several other materials including glass, latex compounds, polyolefins and other polymers. It may also be bonded to the bottom of the floor covering via heat/pressure or adhered with one or more of the standard compounds used in existing hot melt laminating processes.

The finer ground recycled PVB (20 mesh) can be emulsified in systems currently available for the emulsification of other polymers such as polyamides, polyesters, various polyolefins and others. This emulsified mixture may contain fillers and other polymers, as well as standard surfactants and stabilizers for emulsification. The mixture can be applied to the back of a floor covering by any of a number of existing equipment combinations such as those for applying acrylic or SBR latex emulsions, or PVC plastisols. This layer(s) can be the bottom layer of a floor covering, or be used to attach a secondary backing layer to the floor covering.

As an additional embodiment, waste carpeting is initially collected as indicated at 20 in FIG. 2. The collection may comprise post-consumer waste carpeting, waste carpeting from the standard procedures associated with the manufacture of new carpeting, or both. If the waste carpeting collected at 20 is contaminated in any significant manner, it may be cleaned using any suitable conventional technique, either before or after size-reduction as hereinafter described and as indicated at 22 and 24 of FIG. 2.

It is contemplated that according to the present invention the waste carpeting that is optionally and subsequently employed in the practice of the invention is substantially all components of waste carpeting, including the face yarns, primary backing, and primary and secondary backcoatings, and perhaps other components. However under some circumstances for either part or all of the waste carpeting it may be desirable to separate the face and primary backing and backcoatings from each other before further procedures. The optional separation of the carpet components is illustrated schematically at 21 in FIG. 2. The separation may be accomplished, depending upon whether the face and all backings and backcoatings are to be separated, utilizing any suitable conventional technique, such as generally described in U.S. Pat. No. 5,728,741 (the disclosure of which is hereby incorporated by reference herein). If only a certain backing or backcoating is used, an attempt may be made to match it with the manufacture of new backing or backcoating of substantially the same type (e.g., latex backcoating).

While a number of different types of waste carpet material may be optionally used in the present invention, it may be beneficial to process waste carpeting having as constituent components calcium carbonate and a thermoplastic resin mixture. One such waste carpet material is known as Co-Product (Residue from Carpet Recycling Process) manufactured by Evergreen Nylon Recycling LLC, a joint venture of DSM and Honeywell in Augusta, Ga. in which the waste carpet material includes calcium carbonate 50-70%, a thermoplastic resin mixture 0-45%, nylon 0-45% and caprolactam 0-8%, all percentages being by weight. Another such carpet waste material is the product PCR-3, generated from the separation of post-consumer carpet waste by Dupont Flooring Systems Environmental Initiatives Division in Calhoun, Ga. Other trace materials may also appear in the waste material. It is believed these waste product materials are particularly beneficial because at normal temperatures for forming the carpet backcoating, the waste carpet material has temperature, flowability and viscosity parameters suitable with other ingredients of the present invention.

Turning back to FIG. 2, whether or not the waste carpet components are separated, waste carpet material, which may include calcium carbonate and thermoplastic resin, is reduced in size to a particular size corresponding to a filler size used to produce the backcoating for carpeting, as indicated at 22 and 24 in FIG. 2. In addition, densification of the material, by conventional techniques known in the industry such as Condux or extrusion into pellets or strands, as indicated at 23 in FIG. 2, may be employed if necessary. The carpet waste material is reduced in size, preferably ground, to a typical grind useful for resin and latex based compounds for use in backcoating of carpet. This grinding can be achieved with conventional machinery used in the filler trade such as a Pallmann Pulverizer, Raymond Roller Mill or an Imp Mill. Although not necessary with the material described, cryogenic grinding could also be used. No special equipment is needed for grinding the waste carpet material. The ground particulate size is believed to have a preferred range of 50-100 to 95-325 and particularly a 78-200 grind is believed preferred (the first number represents the percentage of the material which will pass through a mesh screen having a mesh size corresponding to the second number). Consequently, the ground waste carpet material can be added as filler to other standard carpeting backing components, as indicated at 33 in FIG. 2.

In a preferred procedure according to the present invention, the properly sized recycled PVB may be used with other standard carpet backcoating components, either for primary backcoating or a secondary backcoating or other backing elements of carpeting (typically collectively referred to as backcoats). For example, the recycled PVB may be used in conjunction with latex, EVA, or PVC backcoatings of conventional construction.

During any of the procedures described above, various conventional refinements may be employed. For example, screening or other contaminate removal practices may be employed as desired to produce a product with the desired properties.

As a consequence of this invention, it is possible to substantially eliminate or significantly reduce land filling or other disposal of PVB (and waste carpeting) without sacrificing product quality by using recovered PVB (and waste carpeting) for carpet backcoatings and other possible end uses.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent products and processes.

What is claimed is:

1. A carpet tile having a face and at least one of a precoat and a main backcoat, and wherein at least one of said precoat and said main backcoat contains recycled polyvinyl butyral and further comprises from about 0.5-10% by weight poly(ethylene oxide) polymer based on the total weight of the carpet tile.

2. A carpet tile as recited in claim 1 wherein at least one of said precoat and said main backcoat comprises greater than 0% and up to about 65% by weight of recycled polyvinyl butyral based on the total weight of the backcoat comprising the recycled polyvinyl butyral.

3. A carpet tile as recited in claim 1 wherein the recycled polyvinyl butyral is reduced in size so that greater or equal to about 90% by weight of the polyvinyl butyral passes through a standard # 12 sieve, but less than or equal to about 10% by weight passes through a standard # 18 sieve, prior to creating the at least one of said precoat and said main backcoat.

4. A carpet tile as recited in claim 1 wherein the at least one of said backcoats comprising the recycled polyvinyl butyral further comprises from about 10% to about 25% by weight plasticizer based on the total weight of the backcoat comprising the recycled polyvinyl butyral.

5. A carpet tile as recited in claim 1 wherein the at least one of said backcoats comprising the recycled polyvinyl butyral further comprises from about 10% to about 25% by weight plasticizer based on the total weight of the backcoat comprising the recycled polyvinyl butyral, wherein the plasticizer is at least one selected from the group of butyl benzoate, benzyl benzoate, butyl oleate and blends thereof.

6. A carpet tile as recited in claim 1 wherein the at least one of said backcoats comprising the recycled polyvinyl butyral further comprises from about 0.25% to about 10% by weight anionic surfactant based on the total weight of the backcoat comprising the recycled polyvinyl butyral.

7. A carpet tile as recited in claim 1 wherein the at least one of said backcoats comprising the recycled polyvinyl butyral further comprises from about 20-60% by weight filler based on the total weight of the backcoat comprising the recycled polyvinyl butyral.

8. A carpet tile as recited in claim 1 wherein the at least one of said backcoats comprising the recycled polyvinyl butyral further comprises from about 20-60% by weight filler based on the total weight of the backcoat comprising the recycled polyvinyl butyral, wherein the filler is at least one selected from the group of calcium carbonate, recycled carpet material and blends thereof.

9. A carpet tile as recited in claim 1 wherein the at least one of said backcoats comprising the recycled polyvinyl butyral further comprises about 1-30% by weight glycol product based on the total weight of the backcoat comprising the recycled polyvinyl butyral.

10. A carpet tile as recited in claim 1 wherein the at least one of said backcoats comprising the recycled polyvinyl butyral further comprises about 1-30% by weight glycol product based on the total weight of the backcoat comprising the recycled polyvinyl butyral, wherein the glycol product is at least one selected from the group of poly(oxy)ethylene glycol, 1,3 propanediol and blends thereof.

11. A carpet tile according to claim 1 wherein at least one of said precoat and said main backcoat comprises greater than 0% and up to 99% by weight recycled polyvinyl butyral based on the total weight of the at least one of said precoat and said main backcoat.

12. A carpet tile as recited in claim 1 which has a structure of components and wherein the recycled polyvinyl butyral is extruded, either alone or in combination with at least one filler or other additive, as a stand-alone sheet or onto a substrate before incorporation in the carpet tile structure, or the recycled polyvinyl butyral is extruded, either alone or in combination with at least one filler or other additive, directly onto a part of the carpet tile structure.

13. A carpet tile as recited in claim 12 wherein the recycled polyvinyl butyral is extruded, either alone or in combination with at least one filler or other additive, onto a stabilizing scrim.

14. Carpet tile having a face and at least one of a precoat and a main backcoat, and wherein at least one of said precoat and said main backcoat contains poly(ethylene oxide) polymer and recycled polyvinyl butyral.

15. A carpet tile as recited in claim 14 wherein at least one of said precoat and said main backcoat comprises greater than 0% and up to about 65% by weight of recycled polyvinyl butyral based on the total weight of the backcoat comprising the recycled polyvinyl butyral.

16. A carpet tile as recited in claim 14 wherein the recycled polyvinyl butyral is reduced in size so that greater or equal to about 90% by weight of the polyvinyl butyral passes through a standard # 12 sieve, but less than or equal to about 10% by weight passes through a standard # 18 sieve, prior to creating the at least one of said precoat and said main backcoat.

17. A carpet tile as recited in claim 14 wherein the at least one of said backcoats comprising the recycled polyvinyl butyral further comprises from about 10% to about 25% by weight plasticizer based on the total weight of the backcoat comprising the recycled polyvinyl butyral.

18. A carpet tile as recited in claim 14 wherein the at least one of said backcoats comprising the recycled polyvinyl butyral further comprises from about 10% to about 25% by weight plasticizer based on the total weight of the backcoat comprising the recycled polyvinyl butyral, wherein the plasticizer is at least one selected from the group of butyl benzoate, benzyl benzoate, butyl oleate and blends thereof.

19. A carpet tile as recited in claim 14 wherein the at least one of said backcoats comprising the recycled polyvinyl butyral further comprises from about 0.25% to about 10% by weight anionic surfactant based on the total weight of the backcoat comprising the recycled polyvinyl butyral.

20. A carpet tile as recited in claim 14 wherein the at least one of said backcoats comprising the recycled polyvinyl butyral further comprises about 0.5-10% by weight poly(ethylene oxide) polymer based on the total weight of the carpet tile.

21. A carpet tile as recited in claim 14 wherein the at least one of said backcoats comprising the recycled polyvinyl butyral further comprises from about 20-60% by weight filler based on the total weight of the backcoat comprising the recycled polyvinyl butyral.

22. A carpet tile as recited in claim 14 wherein the at least one of said backcoats comprising the recycled polyvinyl butyral further comprises from about 20-60% by weight filler based on the total weight of the backcoat comprising the recycled polyvinyl butyral, wherein the filler is at least one selected from the group of calcium carbonate, recycled carpet material and blends thereof.

23. A carpet tile as recited in claim 14 wherein the at least one of said backcoats comprising the recycled polyvinyl butyral further comprises about 1-30% by weight glycol product based on the total weight of the backcoat comprising the recycled polyvinyl butyral.

24. A carpet tile as recited in claim 14 wherein the at least one of said backcoats comprising the recycled polyvinyl butyral further comprises about 1-30% by weight glycol product based on the total weight of the backcoat comprising the recycled polyvinyl butyral, wherein the glycol product is at least one selected from the group of poly (oxy) ethylene glycol, 1,3 propanediol and blends thereof.

25. A carpet tile according to claim 14 wherein at least one of said precoat and said main backcoat comprises greater than 0% and up to 100% by weight recycled polyvinyl butyral based on the total weight of the at least one of said precoat and said main backcoat.

26. A carpet tile as recited in claim 14 which has a structure of components and wherein the recycled polyvinyl butyral is extruded, either alone or in combination with at least one filler or other additive, as a stand-alone sheet or onto a substrate before incorporation in the carpet tile structure, or the recycled polyvinyl butyral is extruded, either alone or in combination with at least one filler or other additive, directly onto a part of the carpet tile structure.

27. A carpet tile as recited in claim 26 wherein the recycled polyvinyl butyral is extruded, either alone or in combination with at least one filler or other additive, onto a stabilizing scrim.

* * * * *